Oct. 24, 1933.  R. G. GRIFFITH  1,931,865
CLUTCH MECHANISM SUITABLE FOR ROTATABLE TYPEHEADS
Filed Feb. 29, 1932  2 Sheets-Sheet 1
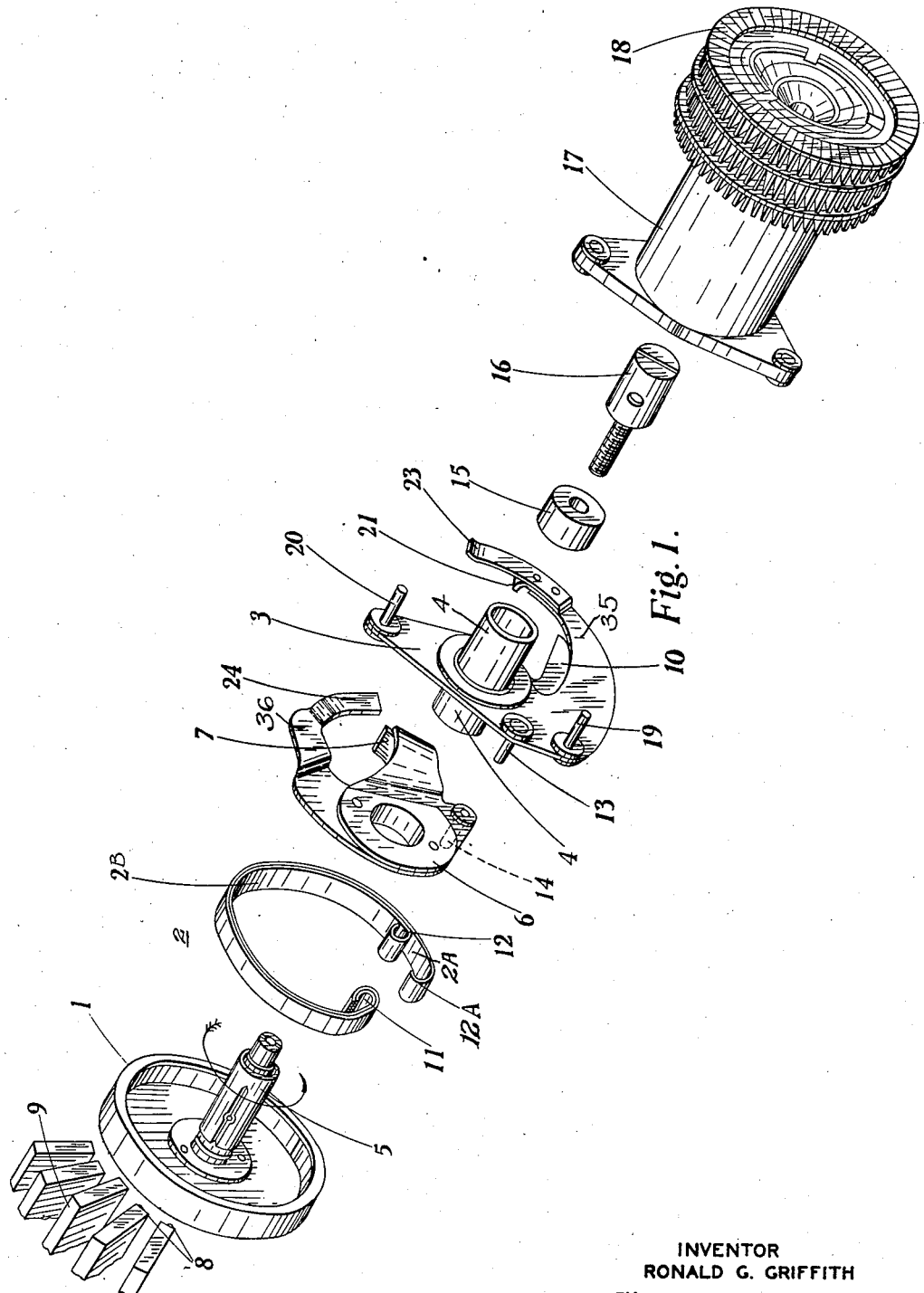
INVENTOR
RONALD G. GRIFFITH
BY
ATTORNEY Oct. 24, 1933.   R. G. GRIFFITH   1,931,865
CLUTCH MECHANISM SUITABLE FOR ROTATABLE TYPEHEADS
Filed Feb. 29, 1932    2 Sheets-Sheet 2
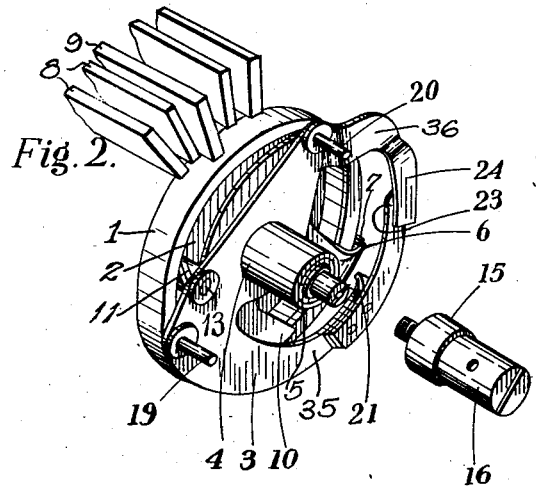
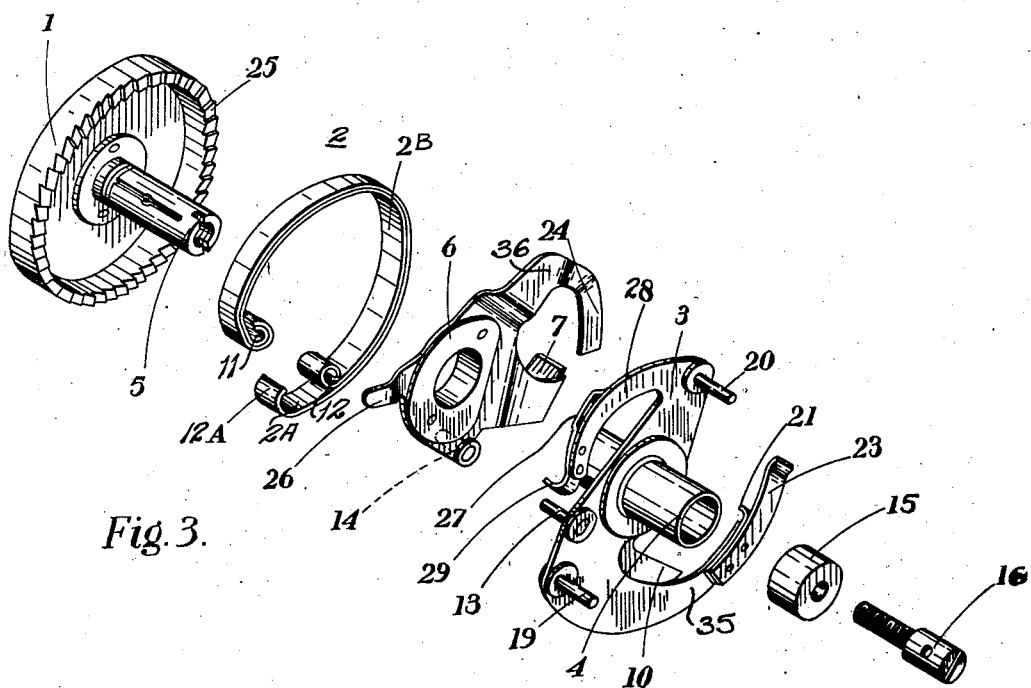
INVENTOR
RONALD G. GRIFFITH
BY R. C. Hapgood
ATTORNEY Patented Oct. 24, 1933

1,931,865

UNITED STATES PATENT OFFICE 1,931,865

CLUTCH MECHANISM SUITABLE FOR ROTATABLE TYPEHEADS

Ronald George Griffith, Croydon, England, assignor to Creed and Company, Limited, Croydon, England Application February 29, 1932, Serial No. 595,854, and in Great Britain January 20, 1932

8 Claims. (Cl. 178—34)

This invention relates to a clutch mechanism particularly suitable although not exclusively for actuating a rotatable typehead for high speed telegraph and like printing apparatus.

Many difficulties have been encountered in producing a satisfactory clutch mechanism for use in conjunction with selecting means to rotate a typehead for instance, carrying a number of type characters to any one of a corresponding number of positions for the printing of a selected character. At high speeds of operation the typehead is repeatedly released for rotation and re-arrested at different positions. It is necessary, therefore, that the typehead be rapidly rotated through the required degree of rotation and be arrested with a minimum of shock and rebound in correct registry at the required position. In this connection reference can usefully be made to U. S. Patent No. 1,905,090 upon which the present invention is an improvement.

The object of the invention is to provide an improved construction whereby a typehead or a like selectably rotatable member may be more rapidly actuated from one position to another and with reduced shock and rebound. To achieve this object the typehead is driven through a form of friction clutch in which a curved spring member is adapted to engage frictionally under spring action with a rotatable driving member whereupon the reaction due to the load of the driven member increases the frictional driving grip of the spring member.

According to a main feature of the invention, therefore, a rotatable clutch mechanism comprises a driving member, a driven member, a stationary series of selectable stop members, a movable stop arm carried by said driven member and engageable with an actuated one of said series of stop members, and a curved spring member attached at opposite ends thereof to said stop arm and said driven member respectively and frictionally engaging said driving member.

In the preferred forms of construction hereinafter described, the spring member frictionally engages with the internal periphery of a cylindrical driving member.

According to other features of the invention, the relative movement of the driven member and the stop arm in this form of construction is also utilized to control other functions such as a latching means to prevent rebound of the driven member on arrest. In a modification, a friction clutch as above outlined is employed to effect the initial movement of the driven member on release and when the stop arm has fully advanced relatively to the driven member a toothed form of clutch ensures the effective rotation of the latter.

These and other features will be evident from the following description in conjunction with the accompanying drawings in which Fig. 1 shows an exploded perspective view of the various parts of one form of construction. Fig. 2 is a perspective view of the assembled parts of the clutch mechanism whilst, Fig. 3 is an exploded perspective view of a modification incorporating a positive type of clutch in addition to a friction clutch.

Referring to Figs. 1 and 2 a clutch drum 1 constituting a driving member is continuously rotatable in the direction shown by the arrow, by a source of power (not shown). A curved spring band 2 is adapted to expand by spring action into frictional engagement with the inner circumference of drum 1. A driven member 3 is loosely rotatable by means of sleeve 4 on a projecting portion of a driving shaft 5 to which drum 1 is attached. A stop arm member 6 is in turn loosely movable in the direction of rotation on an extension of sleeve 4 of the driven member 3. Stop arm member 6 has a projection 7 which is adapted to engage with any actuated one of a number of stationary stop members 8 arranged around the clutch mechanism, the radially inward actuation of a selected stop member to the position shown by member 9 being effected by any convenient means as already well known and not forming an essential feature of the present invention. An abutting portion 10 on driven member 3 is adapted to engage the rear edge of projection 7 on arrest of the stop arm member 6 to effect the definite subsequent arrest of the driven member at the required position.

The curved spring band 2 is attached at the ends 11 and 12 thereof to pins 13 and 14 on the driven member 3 and stop arm member respectively. The spring action of the band in expanding into frictional engagement with the clutch drum 1, tends to move the stop arm member 6 on the driven member into a position in advance of the latter in the direction of rotation. In the example shown in the drawings, the spring band 2 is composed of an inner 2B and an outer band 2A. One end 11 of both bands is attached to pin 13 on the driven member 3, the other end 12 of the inner band 2B only being directly attached to pin 14 on the stop arm member 6. The corresponding end 12A of the outer band terminates in a hooked portion which, as will be more fully explained later, is engaged by end 12 of the inner band 2B bent over pin 14 a short period after relative movement of the stop arm member 6 on driven member 3 effects contraction of the inner band. The whole clutch assembly is carried on the projecting portion of driving shaft 5, a collar 15 and locking screw 16 holding the parts in position. A typehead 17 carrying a number of type characters 18 corresponding to stop members 8, is carried on pins 19 and 20 on the driven member by which it is held.

The clutch construction described will be recognized as a form of friction clutch as when the stop arm member 6 is released for rotation, the spring band 2 and 2A, reacting through the inertia of the driven member and the typehead, expands into frictional engagement with the clutch drum whereupon the driving grip is immediately increased by the motion imparted to the band by the clutch driving member if rotating in the direction shown by the arrow.

In order to prevent rebound of the driven member on arrest of the clutch and to hold the typehead in correct registry for printing from the required character, a latching tooth 21 is formed on a spring extension 35 of the driven member which extension at its extremity 23 engages in the arrested condition of the clutch with a cam surface 24 formed on an extension of the stop arm member 6.

When one of the stop members, for instance 9, is actuated radially inward to the position shown in Figs. 1 and 2, stop arm member 6 is arrested by engagement of projection 7 with the side of the actuated stop member 9. The driven member 3, however, continues to rotate causing the inner band 2B to contract and reduce the pressure of the outer band 2A on the clutch drum 1, and during the contraction of the inner band 2B, the hooked end 12A of the outer band 2A is advanced nearer the bent over end 12 of the inner band. Shortly before the abutting portion 10 on the driven member 3 engages the rear edge of projection 7, the hooked end 12A of the outer band 2A engages the bent over end 12 of the inner band 2B, thereby disengaging the outer from driving engagement with the clutch drum 1. From this position the continued rotation of the driven member 3 is entirely due to its kinetic energy acting against the tension of springs 2A and 2B. Extremity 23 of the extension 35 on driven member 3 now bears against a raised portion 36 of cam surface 24 on the stop arm member 6, thereby causing tooth 21 carried by the driven member 3 to latch over the end of the actuated stop member 9, so that said stop member is gripped between projection on stop arm member 6 and the tooth 21 on the driven member 3, the abutting portion 10 being then in engagement with the rear end of the projection 7 so as to prevent further rotational movement of the tooth 21. This latching of the tooth 21 over the end of the actuated stop member 9 occurs just before the extreme position of the driven member and typehead is reached with portion 10 abutting the rear edge of projection 7. When, by restoration of the actuated stop member 9 to normal position, the stop arm member 6 is released for the next movement of the typehead the cam surface 24 permits tooth 21 to unlatch from the stop member and rotate clear of the series until the next rearrest of the clutch.

It will thus be seen that a rapid engagement of the clutch and a smooth rearrest of the moving parts with the typehead in correct registry can be effected with a minimum of shock.

In the modification shown in Fig. 3 similar parts of a friction clutch and latching means operating similarly to that described with reference to Figs. 1 and 2 are indicated by the same reference numbers. In this case, however, the edge of the clutch drum 1 is also formed with a series of clutch driving teeth 25, and a projection 26 on the stop arm member 6 is adapted to cooperate with a cam surface 27 formed on a spring arm extension 28 of the driven member 3. The spring arm extension also carries a driving pawl tooth 29 which tends to engage with teeth 25 on the clutch drum 1. In the arrested condition of the clutch, the driven member 3 is latched in the selected position by tooth 21 as in the previous example. Projection 26 then bears on the raised portion of cam surface 27 and holds pawl tooth 29 out of engagement with teeth 25 on drum 1. When the clutch is released, stop arm member 6 advances as before and effects a frictional driving engagement of band 2 with drum 1 to start rotation of the driven member. When a certain velocity has been attained and the stop arm member has fully advanced relatively to the driven member 3, projection 26 moves off the raised portion of cam surface 27 and permits pawl tooth 29 to engage with the tooth of the series 25. This positive clutch drive thereby ensures that the driven member attains its full velocity in being moved from one position to another, and the friction clutch provides a smooth and progressive engagement of the parts.

Various modifications in the design and arrangements of the parts of a clutch mechanism according to the present invention can be effected. The two examples herein described, whilst representing the preferred embodiments of the invention are not to be considered as the only methods by which the principles shown can be employed to attain the objects sought.

What is claimed is:

1. A rotatable clutch mechanism comprising a driving member, a driven member, a stop arm carried thereby and movable relatively thereto in the direction of rotation, a spring member frictionally engageable with said driving member and attached at the ends thereof to said driven member and said stop arm respectively, the frictional engagement of said spring member being effected in accordance with the movement of said stop arm relatively to said driven member, a series of driving teeth also carried by said driving member and a driving pawl carried by said driven member and operable into engagement with said driving teeth on release of said stop arm.

2. A rotatable clutch mechanism comprising a cylindrical driving member having an internal driving surface, a driven member carrying a number of type characters, a corresponding number of stop members, a movable stop arm carried by said driven member, a spring band attached by the ends thereof to said driven member and to said stop arm respectively and disposed to engage frictionally with said driving member under control of the movement of said stop arm relatively to said driven member, a latching pawl carried by said driven member and moved into engagement with one of said stop members by a cam surface on said stop arm when arrested to prevent rebound, a series of driving teeth also carried by said driving member and a driving pawl carried by said driven member and operable into engagement with said driving teeth on release of said stop arm.

3. A rotatable clutch mechanism comprising a cylindrical driving member having an internal driving surface, a driven member, a number of stop members, a movable stop arm carried by said driven member, and a spring member comprising an inner and an outer spring band both attached at one end to said driven member, the other end of the inner band being attached to said stop arm member and the corresponding end of the outer band being free thereby permitting relative motion of the two bands, and the outer band being longer than the inner and having its free end formed into a hook for engaging the stop arm thereby disengaging the spring member from the driving member.

4. A rotatable clutch mechanism comprising a driving member, a driven member, a stop arm member, a movable stop arm carried by said driven member and a spring member comprising an inner and an outer spring band both attached at one end to said driven member, the other end of one of said bands being attached to said stop arm member, and the corresponding end of the other said band being free, thereby permitting relative motion of the two bands, and the said other band being longer than the said one band and having its free end formed into a hook for engaging the stop arm thereby disengaging the spring member from the driving member.

5. A rotatable clutch mechanism comprising a cylindrical driving member having an internal driving surface, a driven member carrying a number of type characters, a corresponding number of stop members, a movable stop arm carried by said driven member, a spring band attached by the ends thereof to said driven member and to said stop arm respectively and disposed to engage frictionally with said driving member under control of the movement of said stop arm relatively to said driven member, and a latching pawl carried by said driven member and moved into engagement with one of said stop members by a cam surface on said stop arm when arrested to prevent rebound.

6. In a high speed telegraph apparatus, a type-carrying member, a driving member, a driven member for rotating said type-carrying member, a plurality of selectively-operable stop members, a stop arm carried by said driven member and engageable with an actuated one of said stop members, and a curved spring member attached at one end to said stop arm and at the other end to said driven member, said spring member being normally in frictional engagement with said driving member but removed from such frictional engagement upon the engagement of said stop arm with an actuated stop member.

7. In a high speed telegraph apparatus, a type-carrying member, a cylindrical driving member having an internal driving surface, a driven member for rotating said type-carrying member, a plurality of selectively-operable stop members, a movable stop arm carried by said driven member and engageable with an actuated one of said stop members, and a spring band attached to said stop arm and extending in the direction of rotation of said driving member and in frictional engagement with said internal driving surface the other end of said spring band being attached to said driven member.

8. In a high speed telegraph apparatus, a type-carrying member, a driving member, a driven member for rotating said type-carrying member, a plurality of selectively-operable stop members, a stop arm carried by said driven member and rotatable relatively thereto upon engagement with an actuated one of said stop members, and a band spring frictionally engageable with said driving member and attached at its respective ends to said driven member and said stop arm, the frictional engagement of said band spring with said driving member being controlled by the relative movement occurring between said stop arm and said driven member, and thereby causing the arrest of the type-carrying member in a desired printing position.

RONALD GEORGE GRIFFITH.